(No Model.)
J. STORY.
PIPE COUPLING.
No. 381,966. Patented May 1, 1888.
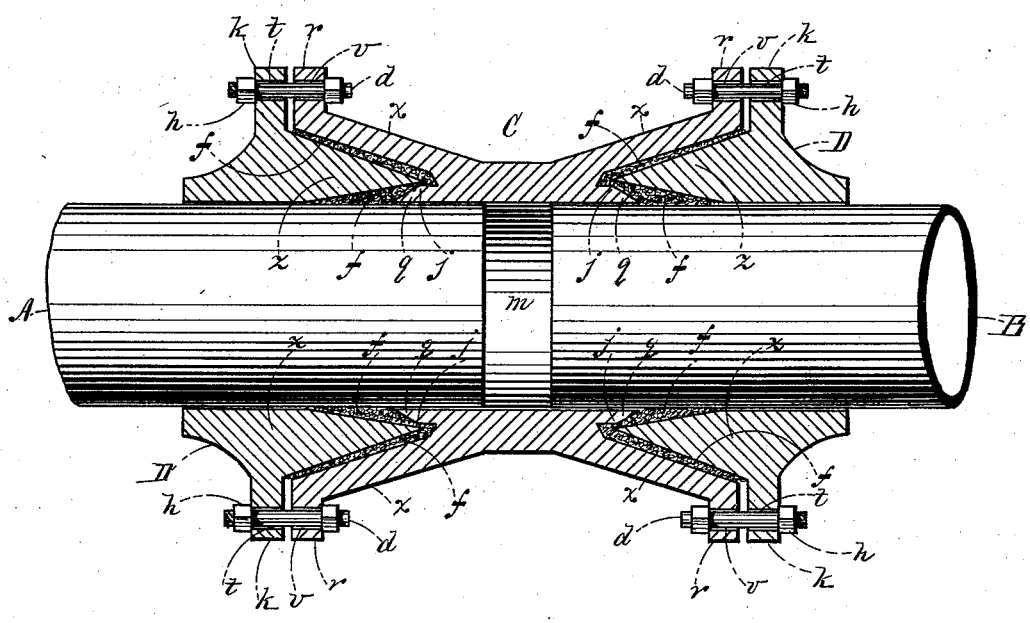
Witnesses:
E. M. Spinney.
Thomas A. Fallon.
Inventor:
John Story,
per C. A. Shaw & Co.
Attys.

UNITED STATES PATENT OFFICE.

JOHN STORY, OF CASTLE SHANNON, PENNSYLVANIA.

PIPE-COUPLING.

SPECIFICATION forming part of Letters Patent No. 381,966, dated May 1, 1888.

Application filed December 1, 1887. Serial No. 256,628. (No model.)

*To all whom it may concern:*

Be it known that I, JOHN STORY, of Castle Shannon, in the county of Allegheny, State of Pennsylvania, have invented a certain new and useful Improvement in Pipe-Couplings, of which the following is a description sufficiently full, clear, and exact to enable any person skilled in the art or science to which said invention appertains to make and use the same, reference being had to the accompanying drawings, forming part of this specification, in which the figure is a vertical longitudinal section showing my improved coupling in use, the pipes being represented in side elevation.

My present invention relates to that class of pipe couplings which are provided with conical or wedge-shaped followers, being designed as an improvement on the coupling shown and described in Letters Patent of the United States, No. 364,449, dated June 7, 1887; and it consists in certain novel features, as hereinafter fully set forth and claimed, the object being to prevent leakage under high pressure and produce a more effective and otherwise desirable device of this character than is now in ordinary use.

The nature and operation of the improvement will be readily understood by all conversant with such matters from the following explanation:

In the drawing, A B represent the pipes, C the sleeve, and D D the followers.

The body of the sleeve constitutes a chamber, $m$, which is of suitable diameter to readily receive the adjacent ends of the pipes A B, and of such length as to permit either of said pipes to be pushed far enough into the same to disengage its opposite end, thereby enabling either of the pipes to be uncoupled and raised when necessary without materially disturbing any other pipe or section of pipe in the same line. Each end of the sleeve is flared to form an annular funnel-shaped socket, $x$, for the reception of the packing $f$, and provided peripherally with an annular flange, $r$, having two or more bolt-holes, $v$.

Two of the followers D are employed with the sleeve C, the inner end of each follower being constructed in the form of an annular wedge, $z$, which is not only adapted to compress the packing $f$ in the narrow or inner end of the socket $x$, but also to partially divide it and press it laterally against the pipe and walls of said socket when the follower is forced inwardly, as hereinafter described. Each of said followers is also provided peripherally with an annular flange, $k$, having two or more bolt-holes, $t$, which are respectively adapted to register with the bolt-holes $v$ in the flanges $r$ of the sleeve. A horizontally-arranged annular flange, $q$, projects outwardly from the body of the sleeve C into each of the sockets $x$, the inner sides of said flanges being preferably straight and in parallelism with the inner side of the body of said sleeve. The outer side of the flange $q$ is provided with an annular boss or shoulder, $j$, between which and the inner side of the annular wedge $z$, near its point, the packing $f$ is compacted or jammed as the wedge is forced into the socket, thereby rendering the joint less liable to leak than when said boss is not employed. The boss also assists in keeping the packing between the wedge $z$ and pipe A in proper position when said pipe expands or contracts.

The object of the annular flange $q$ is to tighten the joint, the packing $f$ being crowded into the space between said flange and the flaring walls of the socket $x$ with great solidity as the follower D is forced into said socket. The use of the flange $q$ also creates a longer and more circuitous route for fluid, gas, &c., escaping from the pipes than when it is not used, thereby greatly reducing the liability of leakage and retarding the flow when leakage exists.

Screw-bolts $d$, provided with nuts $h$, are employed for forcing the followers into the sockets $x$, said bolts being inserted in the holes $t\ v$.

In the use of my improvement one of the followers D, with its wedge $z$ outward, is slipped on over the end of each of the pipes A B and pushed back a short distance to prevent interfering with the introduction of the packing, after which the adjacent ends of said pipes are inserted in the chamber $m$ of the sleeve C. The sockets $x$ are then filled or partially filled with the packing $f$ and the followers D moved toward each other on their respective pipes until their wedges $z$ are brought into contact with the packing, after which the bolts $d$ are placed in the holes $t\ v$ and the nuts $h$ turned onto said bolts, thereby forcing the packing into the sockets $x$ and coupling the pipes in a manner which will be readily understood by all conversant with such matters without a more explicit description.

Having thus explained my invention, what I claim is—

1. In a pipe-coupling, the combination of the following instrumentalities, to wit: a flaring or conical socket containing a packing, a pipe passing longitudinally through said socket and packing into a chamber which connects with a companion pipe, a follower provided with an annular wedge at its inner end and fitted to slide on the pipe which passes through said socket, an annular flange projecting outwardly at the bottom of said socket adjacent to said pipe, and means for advancing said wedge into the packing within said socket to compress the same, and retaining it in its advanced position, said flange being provided on its outer side with an annular boss adjacent to the walls of said socket, substantially as described.

2. In a pipe-coupling, a sleeve provided with a flaring socket and with an outwardly-projecting annular flange at the bottom of said socket integral with the sleeve, in combination with a follower provided with an annular wedge, packing, and bolts for clamping said sleeve and follower, substantially as described.

3. In a pipe-coupling, a sleeve provided with a flaring socket and with an outwardly-projecting annular flange at the bottom of said socket integral with said sleeve, said flange having an annular boss, in combination with a follower, a packing, and means for clamping said follower to said sleeve, substantially as described.

4. A pipe-coupling comprising a sleeve having a central chamber and provided with flaring sockets at its opposite ends for receiving packing, and with integral outwardly-projecting annular flanges at the bottoms of said sockets, followers having inwardly-projecting annular wedges, and means for clamping said followers to said sleeve, substantially as described.

5. A pipe-coupling comprising a sleeve having a central chamber and provided with flaring sockets at its opposite ends for receiving packing, and at the bottoms of said sockets with integral outwardly-projecting annular flanges having annular bosses, followers having inwardly-projecting annular wedges, and means for clamping said followers to said sleeve, substantially as described.

6. The combination of a sleeve having a central chamber and provided with flaring sockets at its opposite ends and with integral outwardly-projecting annular flanges at the bottoms of said sockets, pipes extending through said sockets into said central chamber, packing inserted in said sockets around said pipes, followers having inwardly-projecting annular wedges for compressing said packing in the sockets against the pipes, and means for clamping said followers to said sleeve, substantially as described.

JOHN STORY.

Witnesses:
E. P. JONES, Jr.,
J. H. JOHNSTON.